United States Patent
Merchant et al.

(10) Patent No.: US 9,359,951 B2
(45) Date of Patent: Jun. 7, 2016

(54) INLET BLEED HEAT SYSTEM AND RELATED METHOD FOR A COMPACT GAS TURBINE INLET

(71) Applicant: General Electric Company, Schenectady, NY (US)

(72) Inventors: Laxmikant Merchant, Bangalore (IN); Srinivas Avishetti, Bangalore (IN); Valery Ivanovich Ponyavin, Greenville, SC (US); Doug Byrd, Greenville, SC (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 14/019,791

(22) Filed: Sep. 6, 2013

(65) Prior Publication Data

US 2015/0068217 A1    Mar. 12, 2015

(51) Int. Cl.
*F02C 7/08* (2006.01)
*F02C 7/04* (2006.01)
*F02C 7/047* (2006.01)
*F02C 7/045* (2006.01)

(52) U.S. Cl.
CPC ... *F02C 7/08* (2013.01); *F02C 7/04* (2013.01); *F02C 7/045* (2013.01); *F02C 7/047* (2013.01)

(58) Field of Classification Search
CPC .............. F02C 7/08; F02C 7/10; F02C 7/045; F02C 7/047; F02C 7/04
USPC .............. 60/782, 785, 39.093; 415/116, 58.5
See application file for complete search history.

(56) References Cited

U.S. PATENT DOCUMENTS

| | | | | | |
|---|---|---|---|---|---|
| 5,560,195 | A | * | 10/1996 | Anderson | F02C 7/08 417/80 |
| 6,027,304 | A | * | 2/2000 | Arar | F02C 7/045 415/116 |
| 7,520,137 | B2 | * | 4/2009 | Hoffmann | F02C 7/1435 60/39.3 |
| 7,913,936 | B2 | * | 3/2011 | Hoffmann | F02C 7/045 239/390 |
| 8,001,789 | B2 | * | 8/2011 | Vega | F02C 6/08 415/116 |
| 8,083,466 | B2 | | 12/2011 | Zhang et al. | |
| 2004/0001751 | A1 | * | 1/2004 | Poccia | F02C 7/08 415/116 |
| 2009/0241552 | A1 | | 10/2009 | Vega et al. | |
| 2013/0115061 | A1 | | 5/2013 | Ponyavin et al. | |

* cited by examiner

*Primary Examiner* — Steven Sutherland
(74) *Attorney, Agent, or Firm* — Nixon & Vanderhye P.C.

(57) ABSTRACT

An inlet system for a gas turbine includes an inlet air duct; a silencer disposed in the inlet air duct, the silencer including a plurality of panels with spaces between the panels; and a conduit with orifices disposed to inject inlet bleed heat into each of the spaces. A method of conditioning inlet air for a gas turbine includes flowing air through spaces between panels of a silencer in an inlet air duct of the gas turbine, and injecting inlet bleed heat through orifices and into each of the spaces.

21 Claims, 13 Drawing Sheets

INLET BLEED HEAT SYSTEM AND RELATED METHOD FOR A COMPACT GAS TURBINE INLET

BACKGROUND OF THE INVENTION

The subject matter disclosed herein relates to an inlet bleed heat (IBH) system and method for a compact gas turbine inlet. The subject matter disclosed herein relates particularly to an inlet bleed heat system and method for a compact gas turbine inlet with improved mixing of the inlet bleed heat.

U.S. Patent Application Publication No. 2009/0241552 discloses an inlet bleed heat system with a supply conduit, a plurality of feed tubes extending from the supply conduit, and a guide tube for receiving ends of the feed tubes opposite of the supply conduit. The feed tubes each have a plurality of injection orifices and the feed tubes are oriented such that the injection orifices generally face into a flow of oncoming air.

Another inlet bleed heat system is disclosed in U.S. Patent Application Publication No. 2013/0115061, which is co-assigned to General Electric Company.

BRIEF DESCRIPTION OF THE INVENTION

The system disclosed in U.S. Patent Application Publication No. 2009/0241552 has certain disadvantages. A first disadvantage is that a longer duct length is required to provide adequate mixing of the inlet bleed heat. A second disadvantage is that the arrangement of the injection orifices results in excessive noise. A third disadvantage is that the arrangement of the feed tubes requires an excessive number of feed tubes, which results in high cost and complexity of the system.

Aspects of the inlet bleed heat system described herein provide solutions to one or more problems or disadvantages associated with the prior art.

In one exemplary but non-limiting aspect, the present disclosure relates to an inlet system for a gas turbine. The system comprises an inlet air duct; a silencer disposed in the inlet air duct, the silencer including a plurality of panels with spaces between the panels; and a conduit with orifices disposed to inject inlet bleed heat into each of the spaces.

In another exemplary but non-limiting aspect, the present disclosure relates to a power plant. The power plan comprises a gas turbine that includes a compressor, a combustion system, and a turbine section; a mechanical or electrical load; and an inlet system for the gas turbine. The inlet system comprises an inlet air duct; a silencer disposed in the inlet air duct, the silencer including a plurality of panels with spaces between the panels; and a conduit with orifices disposed to inject inlet bleed heat into each of the spaces.

In another exemplary but non-limiting aspect, the present disclosure relates to a method of conditioning inlet air for a gas turbine. The method comprises flowing air through spaces between panels of a silencer in an inlet air duct of the gas turbine, and injecting inlet bleed heat through orifices and into each of the spaces.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present disclosure may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the figures. Indeed, the element or elements of an embodiment of the present disclosure may be oriented in any direction and the terminology, therefore, should be understood as encompassing such variations unless specified otherwise.

As used throughout the specification and claims, "substantially" includes at least deviations from ideal or nominal values that are within manufacturing and/or inspection tolerances.

The present disclosure may be applied to the variety of combustion turbine engines that compress an ingested air, such as, but not limiting of, a heavy-duty gas turbine; an aero-derivative gas turbine; or the like. An embodiment of the present disclosure may be applied to either a single combustion turbine engine or a plurality of combustion turbine engines. An embodiment of the present disclosure may be applied to a combustion turbine engine operating in a simple cycle or combined cycle.

Figure 1:
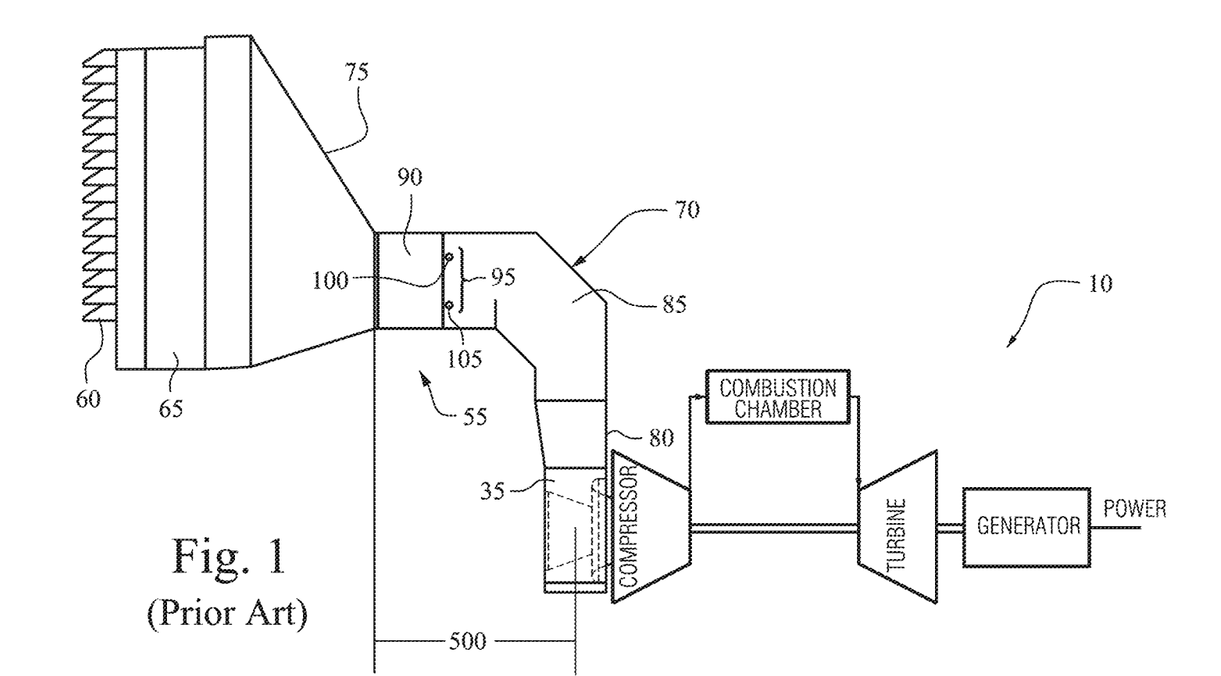
FIG. 1 is a simplified side elevation of a known inlet system for a gas turbine engine.

FIG. 1 illustrates a prior art system with a combustion turbine engine 10, an inlet system 55 and an inlet bleed heat system (IBH system) 95.

The combustion turbine engine 10 generally comprises a compressor and a turbine section. The compressor includes a compressor inlet. The compressor inlet may include a plurality of inlet guide vanes (IGVs) arranged downstream of an inlet plenum 35. The combustion turbine engine 10 also generally includes a turbine section fluidly connected to an exhaust diffuser (not shown).

The inlet system 55 generally comprises a weather hood 60 mounted to an upstream end of an inlet filter house 65. The weather hood 60 is fluidly connected to inlet plenum 35 via an inlet air duct 70. Inlet air duct 70 includes a first end portion 75 that extends to a second end portion 80 through an intermediate portion 85. The first end portion 75 may be orientated in a direction substantially parallel to a centerline of the compressor and defines an inlet for receiving ambient air. The second end portion 80 may be orientated in a direction substantially perpendicular to a centerline of the compressor and defines an outlet of the duct 70 that directs the ambient air towards the compressor inlet.

The inlet system 55 also includes an inlet silencer 90 arranged downstream from inlet filter house 65 and an IBH system 95 arranged downstream from inlet silencer 90. The second end portion 80 of the duct 70 is fluidly connected to the diffuser and compressor inlet, both of which are adjacent to the inlet air duct 70.

The IBH system 95 includes first and second conduits 100, 105 that establish vertical curtains of heated air within the inlet air duct 70. The first and second conduits 100 and 105 may be fluidly connected to an extraction manifold in the combustion turbine engine 10 via an IBH delivery conduit (not illustrated). The conduit includes associated piping that fluidly connects the extraction manifold to the first and second conduits 100, 105.

Figure 2:
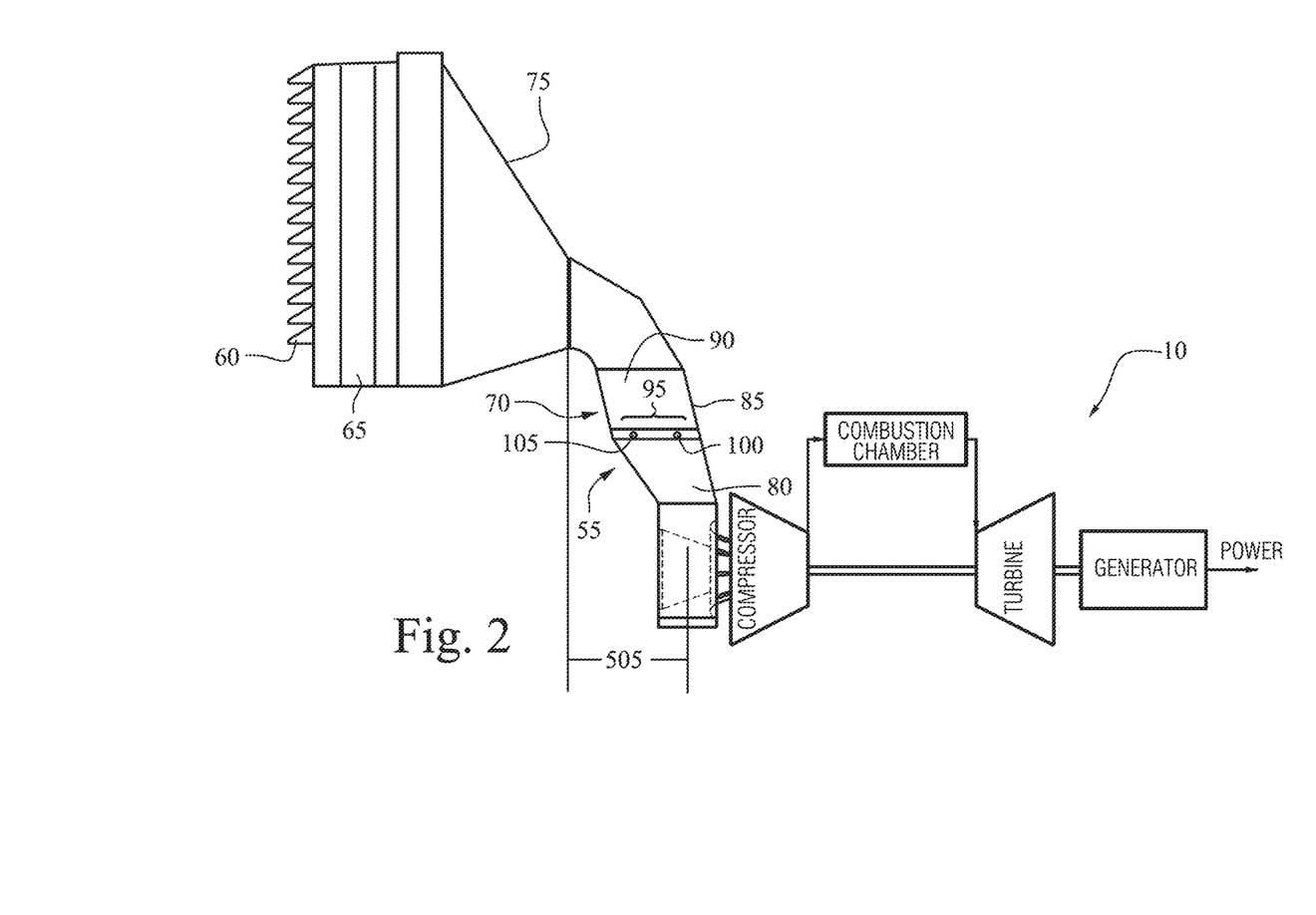
FIG. 2 is a simplified side elevation of an inlet system for a gas turbine engine in accordance with an exemplary but non-limiting aspect of the disclosure.

FIG. 2 illustrates a system in accordance with the present disclosure and includes all of the components of FIG. 1, so further description of those components is omitted. Generally, the system as disclosed in FIG. 2 differs from the system of FIG. 1 in orientation of and specific details of the components, which will be described in further detail below. The result of the differences is that the distance 500 in FIG. 1 from an inlet of the silencer 90 to a midpoint of the inlet of the combustion turbine is considerably longer than the distance 505 in FIG. 2. The reduction in distance may be achieved, at least in part, due to the differences in IBH system 95. In a non-limiting example, the distance 500 is 24 feet whereas the distance 505 is 15 feet. Thus, for reasons discussed in detail below, the overall size of an inlet system can be advantageously reduced by about 37.5% in one exemplary implementation.

The system of in accordance with the present disclosure, e.g., the system of FIG. 2, may be included in a power plant. The power plant may include a gas turbine 10, where the gas turbine includes a compressor, a combustion system, and a turbine section. Typically, a mechanical or electrical load will be included.

Figure 3:
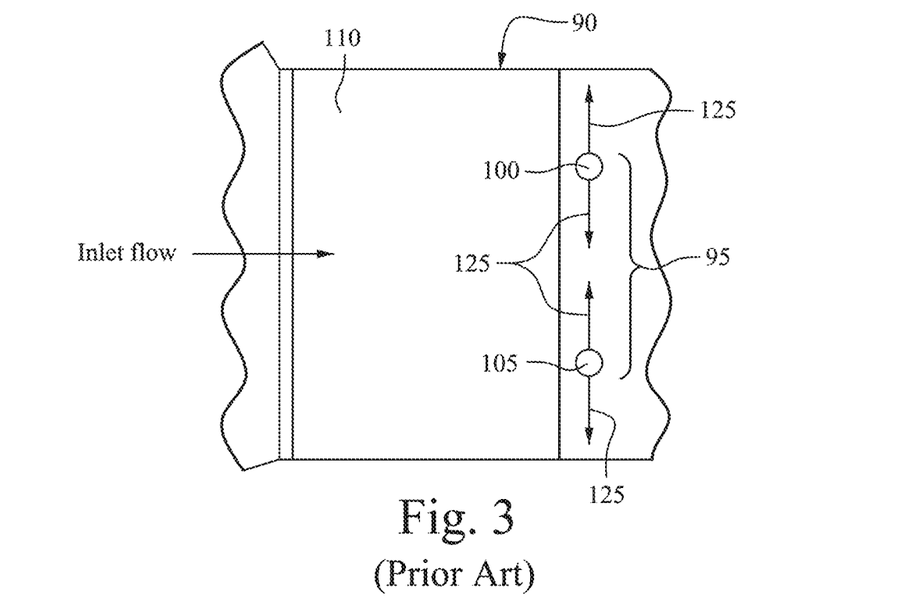
FIG. 3 is an enlarged detail taken from FIG. 1.

FIG. 3 illustrates the silencer 90 and inlet bleed heat system 95 of FIG. 1 in greater detail where a vertically-oriented silencer panel 110 is illustrated from a side view. IBH jets 125 exit from the first conduit 100 and second conduit 105 in a direction substantially perpendicular to a direction of air inlet flow. The IBH jets 125 are formed by orifices (not visible) in the first and second conduits 100, 105.

Figure 4:
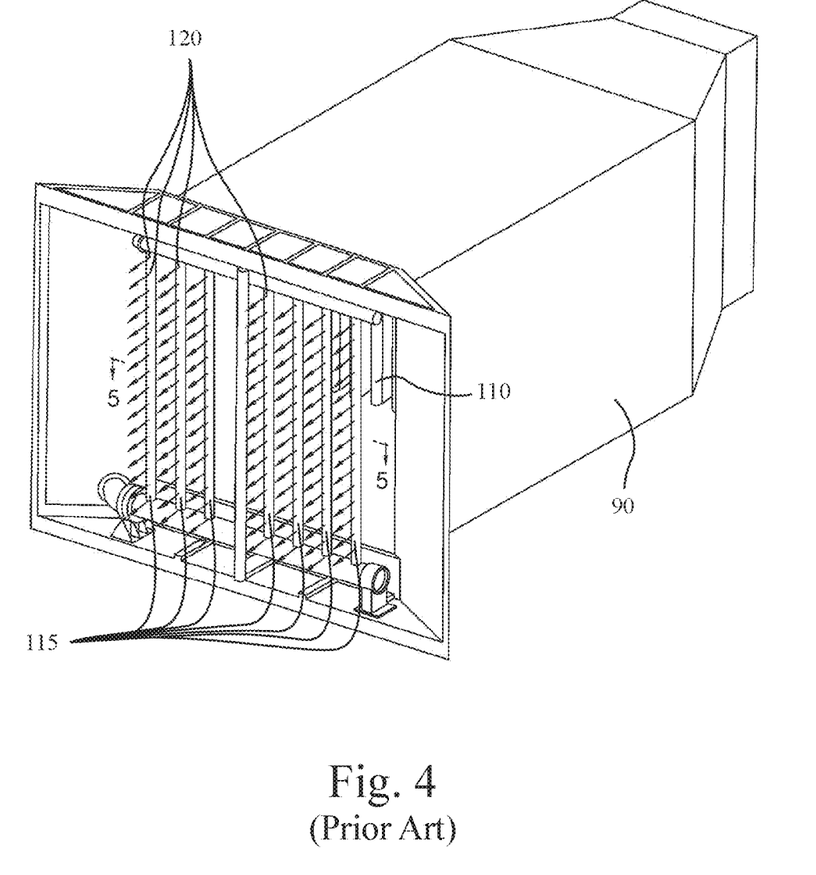
FIG. 4 is a perspective view of another known silencer and inlet bleed heat system.

FIG. 4 illustrates a configuration according to U.S. Patent Application Publication No. 2009/0241552. In this configuration, a plurality of IBH conduits 115 are each aligned with and upstream of a plurality of vertically-oriented and laterally-spaced silencer panels 110. Each of the IBH conduits 105 has a plurality of orifices 120 that are oriented to inject inlet bleed heat counter or upstream with respect to a flow direction of inlet air.

Figure 5:
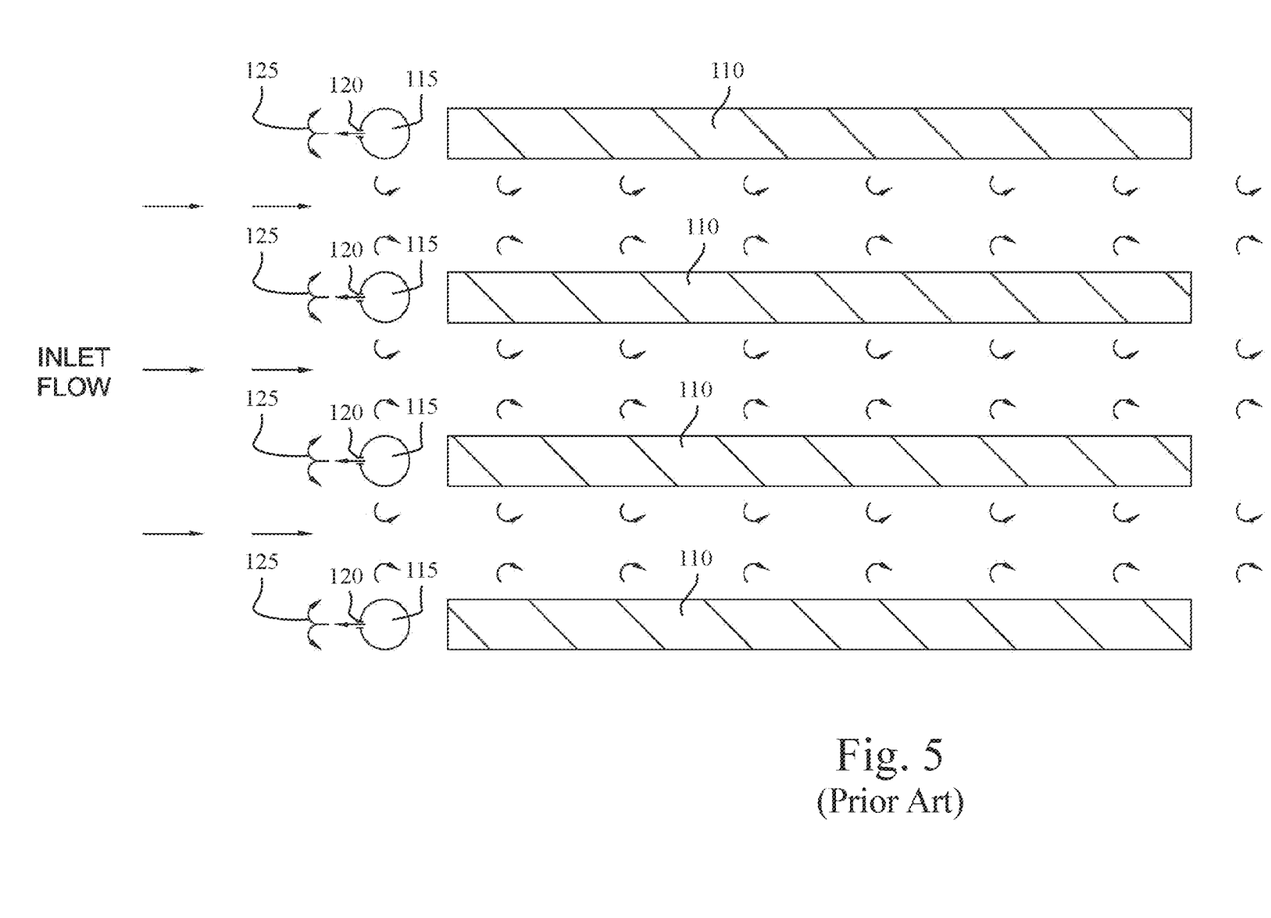
FIG. 5 illustrates a partial, horizontal cross section of the silencer and inlet bleed system of FIG. 4.

FIG. 5 illustrates a cross sectional view of FIG. 4. FIG. 5 readily illustrates the alignment between the IBH conduits 115 and silencer panels 110. Because of this relative alignment, the IBH conduits 115 are located in a zone of relatively low inlet air flow velocity. The inlet air flow will have a flow velocity at or near zero at the leading edges of the silencer panels 110 and the IBH conduits 115. A maximum inlet air flow velocity and/or maximum turbulence will be achieved somewhere between the silencer panels 110 because the flow area is restricted. Accordingly, the minimum inlet air flow velocity is achieved upstream (to the left in FIG. 5) of the IBH conduits 115.

The configuration of FIG. 5 has several drawbacks. First, the IBH jets 125 exiting from the orifices 120 are being injected into an area that has the lowest relative inlet air velocity of this portion of the system. Thus, this configuration results in the IBH jets 125 flowing upstream the maximum possible distance before the inlet air flow causes the IBH jets 125 to reverse flow, mix with the inlet air stream and flow through between the silencer panels 110. Second, when the IBH jets 125 exit the orifices 120 at sonic velocity, there is nothing to dampen the sound. This results in undesirable noise caused by the IBH jets 125. Third, there is a one to one correlation between the IBH conduits 115 and the silencer panels 110, which results in high cost and complexity of the system.

Figure 6:
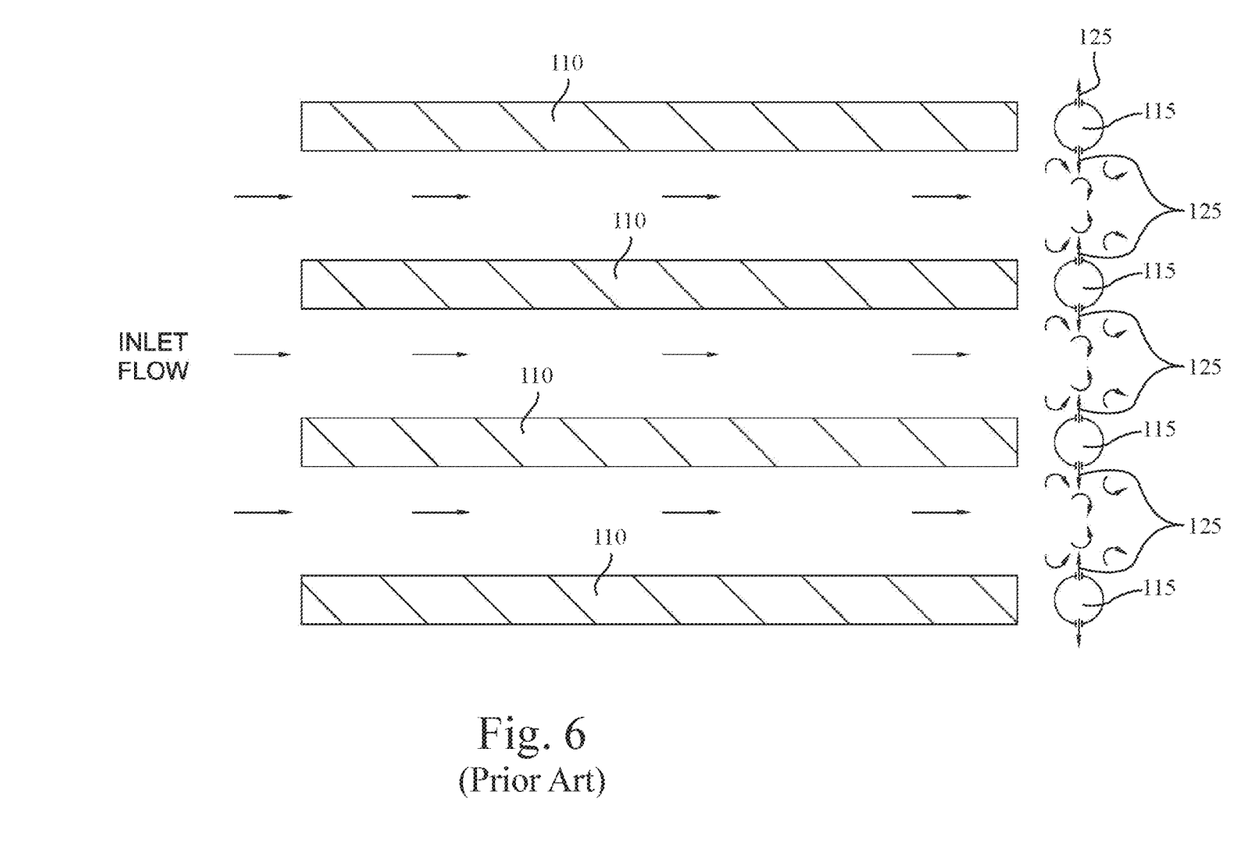
FIG. 6 illustrates another known relationship between silencer panels and inlet bleed heat conduits.

FIG. 6 illustrates another configuration of U.S. Patent Application Publication No. 2009/0241552. This configuration is similar to that illustrated in FIG. 5, except that the IBH conduits 115 are located downstream relative to the silencer panels 110 and the orifices 120 are oriented so that the IBH jets 125 are initially perpendicular to the inlet air flow direction.

Figure 7:
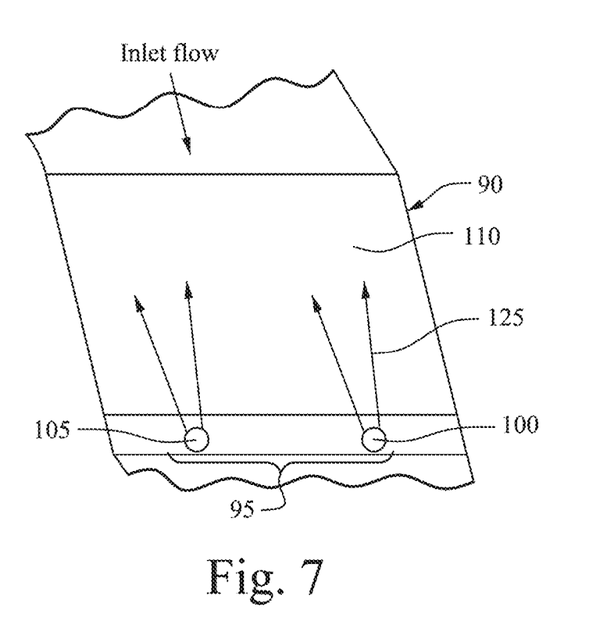
FIG. 7 is an enlarged detail taken from FIG. 2.

FIG. 7 illustrates the silencer 90 and inlet bleed heat system 95 of FIG. 2 in greater detail. IBH jets 125 are formed by orifices 120 (not visible) in the first and second conduits 100, 105. The IBH jets 125 exit from the first conduit 100 and second conduit 105 in a direction generally against a direction of air inlet flow. Thus, as illustrated, the IBH jets 125 have at least part of a positive velocity component that is opposite to a direction of air inlet flow through the silencer 90. There may also be a positive component of velocity that is perpendicular to the direction of air inlet flow. The resultant vector of the IBH jets 125 may be at some angle between perfectly counter flow and perfectly perpendicular flow. Thus the orifices 120 are configured such that the IBH jets 125 exit at substantially sonic velocity and flow generally against the inlet air flow and into the silencer. A direction that the inlet bleed heat flows thus changes, and may completely reverse, due to inlet air flow through the spaces as the inlet air flow and inlet bleed heat mix.

The configuration of FIG. 7 also illustrates the first and second conduits 100, 105 substantially perpendicular to the silencer panels 110. Although two conduits are illustrated, a single conduit or more than two conduits could be used depending, for example, on factors such as the desired size of the system and mixing of inlet bleed heat. As illustrated throughout the figures, the first and second conduits 100, 105 are substantially the same as one another, but differences could be provided based upon the needs of a particular design. An advantage that may be realized in the practice of some embodiments of the described systems and techniques is that the number of conduits can be minimized in order to reduce cost and complexity of the system while achieving adequate mixing of the inlet bleed heat. This is in contrast to some prior art systems that require a conduit for each silencer panel 120.

Figure 8:
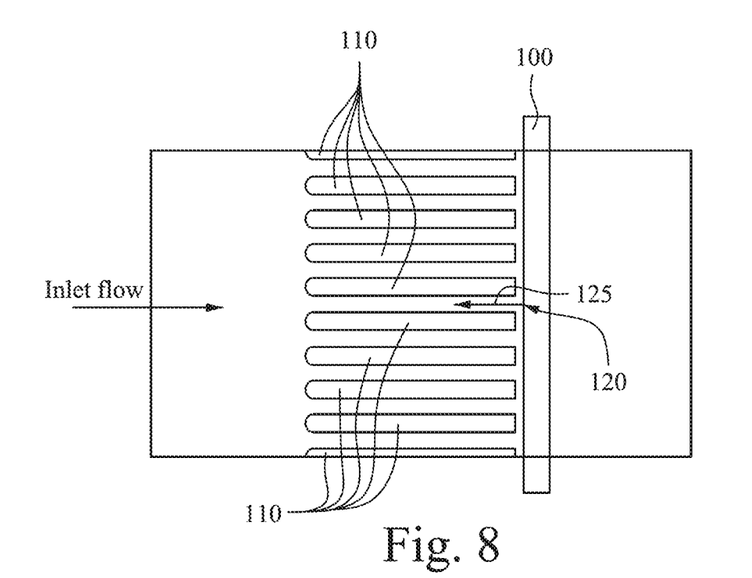
FIG. 8 illustrates a schematic relationship between a silencer and inlet bleed heat conduit as shown in FIG. 7.

FIG. 8 is a simplified view taken from a direction of an edge of the silencer panels 110, perpendicular to the inlet air flow direction and perpendicular to the first conduit 100 (only the first conduit 100 is illustrated, but the second conduit 105 and other conduits could be provided). In this view, only one IBH jet 125 and one orifice 120 are illustrated for simplicity. FIG. 8 illustrates how the orifice 120 is substantially aligned with a center of the space between two adjacent silencer panels 110. This configuration results in the IBH jet 125 being injected into an air gap between the panels 110 that has an area of maximum velocity (at least locally) of the inlet air. Even though the orifice 120 is located downstream of the silencer panels 110, the IBH jet 125 exits at or near sonic velocity and travels upstream to be injected into the area between the silencer panels, where the two flows begin to mix and the inlet bleed heat eventually reverses flow and because indistinguishable from the inlet air flow. An advantage that may be realized in the practice of some embodiments of the described systems and techniques is that the inlet bleed heat is injected into an area of maximum velocity and/or turbulence, which results in improved mixing relative to some prior art.

Figure 9:
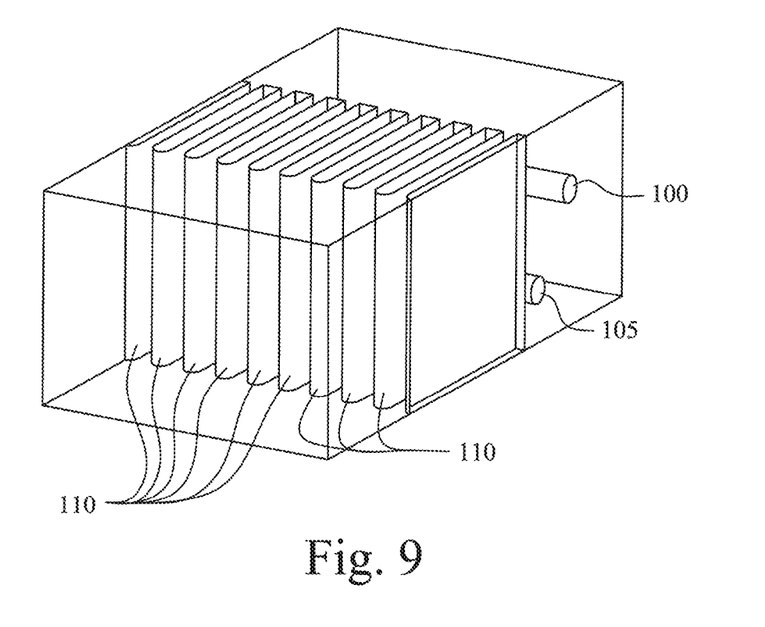
FIG. 9 illustrates an isometric view of the components in FIG. 8.

FIG. 9 is an isometric view of the system shown in FIG. 8.

Figure 10:
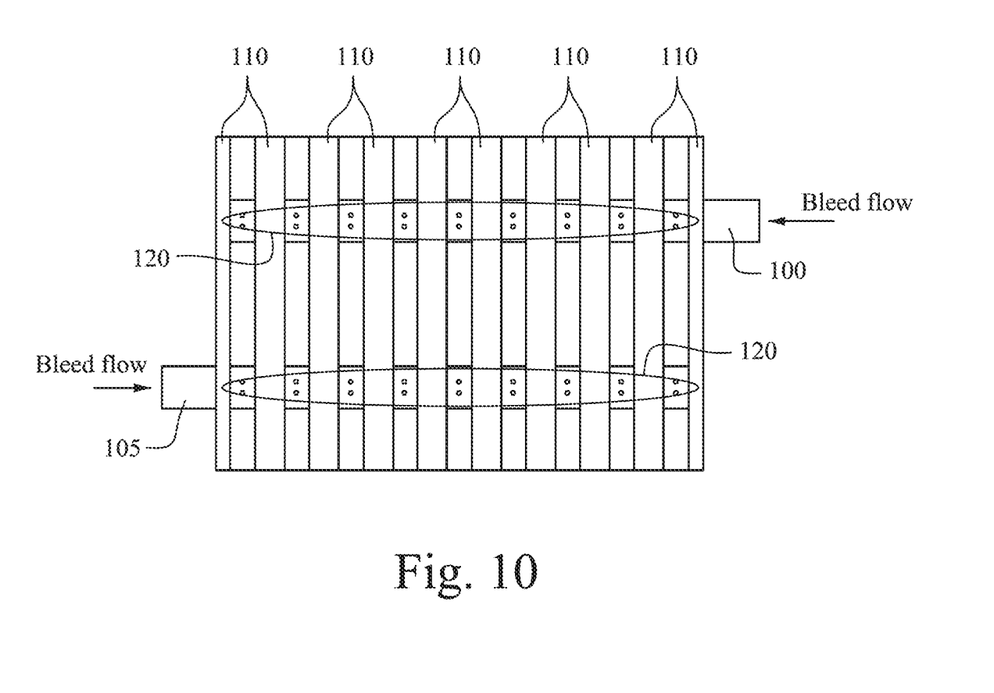
FIG. 10 illustrates the system shown in FIG. 8 looking downstream towards the silencer panels and orifices of the bleed heat conduits.

FIG. 10 illustrates the system shown in FIG. 8 looking downstream towards the silencer panels 110 and orifices 120. As can be seen in FIG. 10, each of the orifices 120 are substantially aligned between two silencer panels 110 such that inlet bleed heat can be injected between the silencer panels 110, with all of the silencer panels 110 being substantially parallel to one another. FIG. 10 illustrates two orifices 120 on each of the first and second conduits 100, 105 in each gap between silencer panels 110. Thus, each of the first and second conduits may have a number or orifices 120 that is an integer multiple of a number of spaces between the silencer panels 110. Although illustrated with pairs of orifices 120, a single orifice 120, or more than two orifices 120, could be provided where each pair is illustrated. If two or more orifices 120 are provided at each illustrated location, the inlet bleed heat can disperse and/or mix relatively more quickly than if a single orifice is provided, which may result in a relatively shorter distance to achieve complete mixing of the inlet bleed heat and the inlet air.

Figure 11:
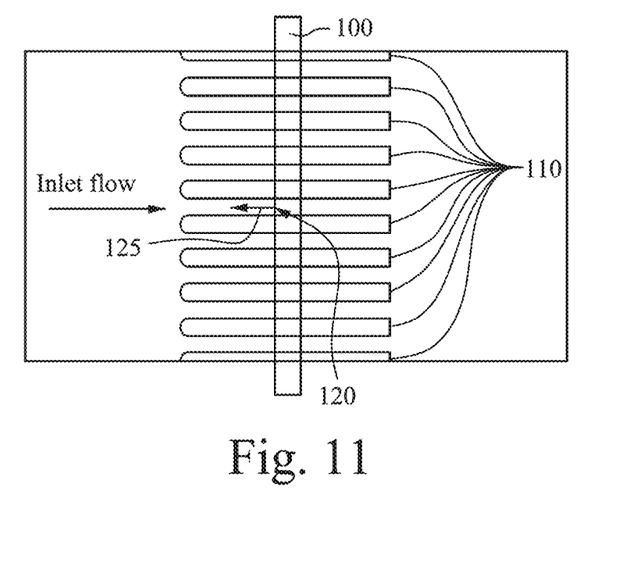
FIG. 11 illustrates an alternative configuration of the components shown in FIG. 8.

FIG. 11 is similar to FIG. 8 except that the first conduit 100 (and/or second conduit 105, not visible) is located between upstream and downstream ends of the silencer panels 110. Alternatively, just the orifices 120 could located between an upstream and a downstream end of the silencer panels 110, with some or all of the first conduit 100 being located outside the expanse of the silencer panels 110. Thus, FIG. 11 illustrates that the first conduit 100 could be moved anywhere such that the orifices 120 are located between the upstream and downstream ends of the silencer panels 110. An advantage that may be realized in the practice of some embodiments of the described systems and techniques is that with the first conduit 100 and/or second conduit 105 located such that the orifices 120 are between the silencer panels 110, sonic jet noise attenuations may be realized. An advantage that may be realized in the practice of some embodiments of the described systems and techniques is that additional mixing length between the silencer panels 110 may be achieved.

Figure 12:
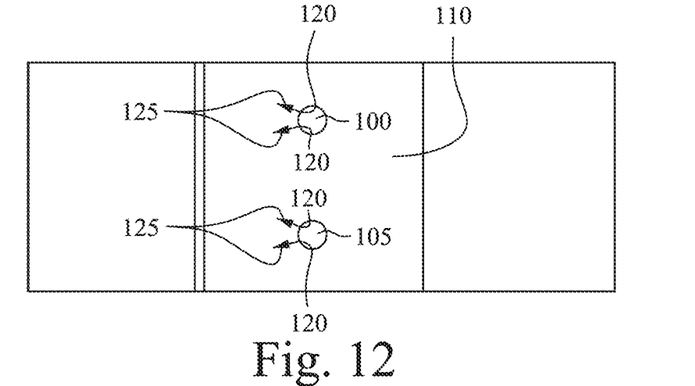
FIG. 12 illustrates the components of FIG. 11 viewed from a direction parallel to the bleed heat conduits.

FIG. 12 is similar to FIG. 11 except that the view is perpendicular to a side of the silencer panels 110.

Figure 13:
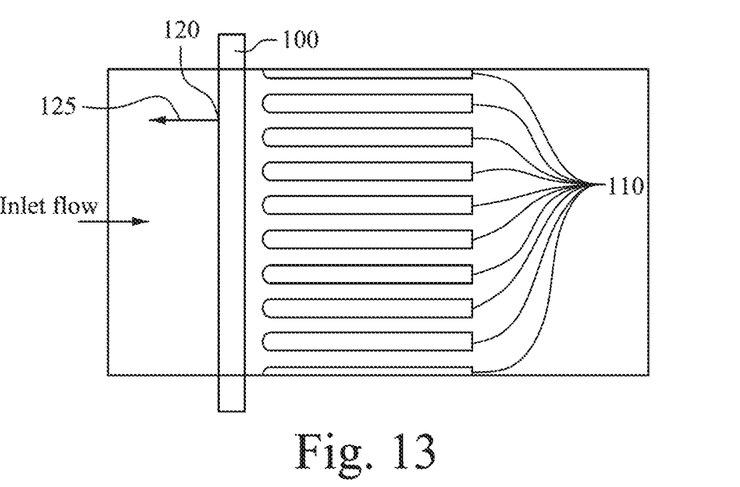
FIG. 13 illustrates an alternative configuration of the components shown in FIG. 8.

FIG. 13 shows another configuration. Here, the first conduit 100 is located upstream relative to a leading edge of the silencer panels 110. Similar to the configurations illustrated above, the orifices 120 (only one illustrated for simplicity) is located substantially midway between two silencer panels 110 to take advantage of the relatively high velocity generated between the silencer panels 110.

Figure 14:
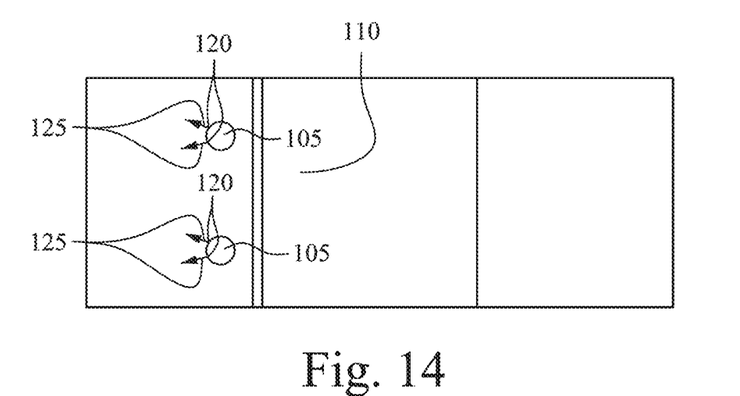
FIG. 14 illustrates the components of FIG. 13 viewed from a direction parallel to the bleed heat conduits.

FIG. 14 illustrates the configuration of FIG. 13 with a view similar to FIG. 12. In this configuration, the orifices 120 are illustrated in pairs such that each individual IBH jet 125 is at an angle relative to inlet air flow direction. As discussed above, one or more than two orifices 120 could be provided at each location. The orifices 120 can be oriented at any angle to take advantage of the increased velocity generated between the silencer panels 110.

FIGS. 8-14 illustrate exemplary locations of the first and second conduits 100, 105, which can be broadly categorized as upstream of a leading edge of the silencer panels 110 (FIGS. 13 and 14) or downstream of a leading edge of the silencer panels 110 (FIGS. 8-12). Whether the first and second conduits 100, 105 are upstream or downstream of the leading edge may influence a relative angle of the orifices 120. If the first and second conduits 100, 105 are upstream of the leading edge of the silencer panels 110, one or more orifice 120 may form an angle with respect to the air inlet flow direction, e.g., an angle from 45°-90°. If the first and second conduits 100, 105 are downstream of the leading edge of the silencer panels 110, one or more orifice 120 may form an angle with respect to the air inlet flow direction, e.g., an angle from 15°-60°. In either configuration, the orifices 120 may be oriented such that the IBH jets 125 are oriented in a plane parallel to plane of the silencer panels 110. An advantage that may be realized in the practice of some embodiments of the described systems and techniques is that an angle of the IBH jets 125 with respect to the inlet air flow direction may be optimized based upon a location of the first and second conduits 100, 105.

Figure 15:
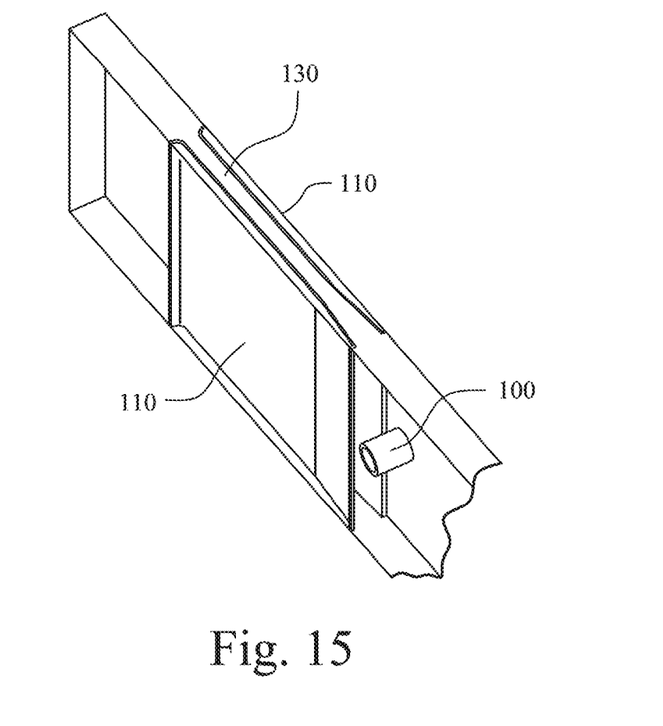
FIG. 15 illustrates a section of a silencer and inlet bleed heat system used for a computational fluid dynamics model.
Figure 16:
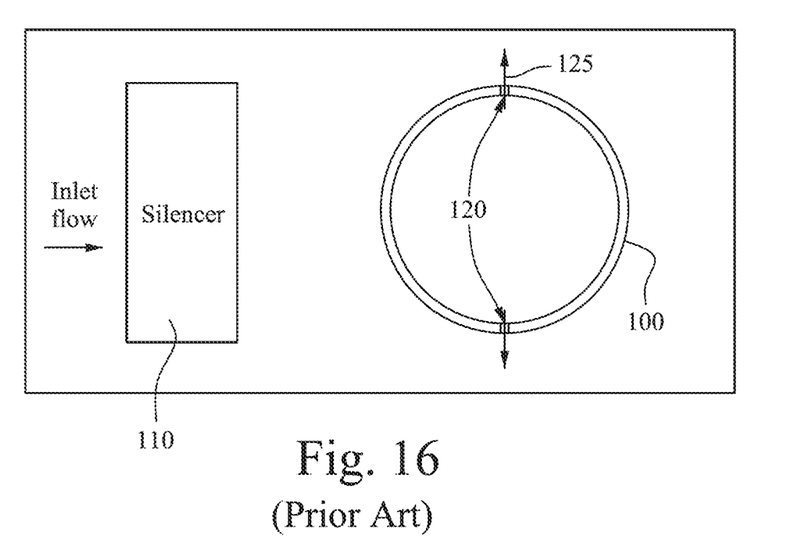
FIG. 16 illustrates a known configuration of a silencer and inlet bleed heat system used for a computational fluid dynamics model.

FIGS. 15-18 illustrate modeling that was performed of the present system and of the prior art (see FIG. 16).

FIG. 15 illustrates a single flow channel 130 between two silencer panels 110. The silencer panels 110 are cut in half for the fluid model so that a single channel could be modeled. A corresponding section of the first conduit 100 is also illustrated.

Figure 17:
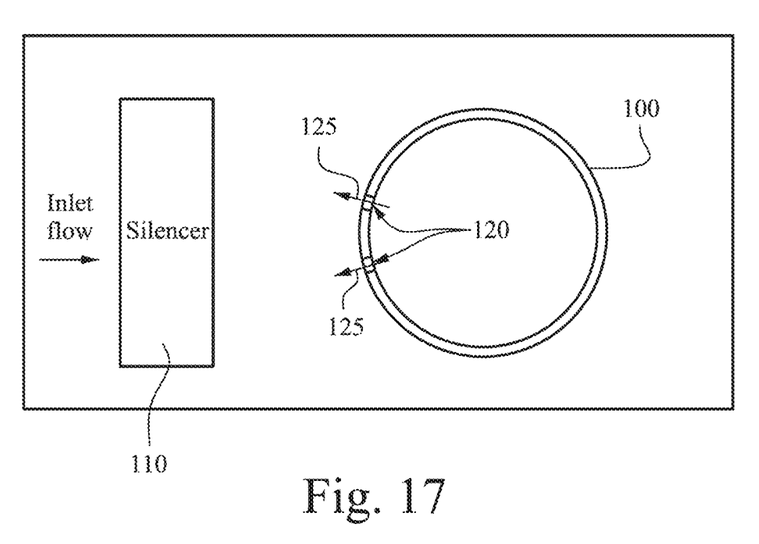
FIG. 17 illustrates a configuration of a silencer and inlet bleed heat system used for a computational fluid dynamics model of components similar to those in FIG. 8.

Two configurations were modeled. The first configuration, shown in FIG. 16, illustrates IBH jets 125 that are perpendicular to a direction of inlet air flow in accordance with the prior art. The second configuration, shown in FIG. 17, illustrates two IBH jets 125 directed into the direction of air flow. Each of the IBH jets is at an angle of about 15° (opposite to one another) with respect to the inlet air flow direction.

Figure 18:
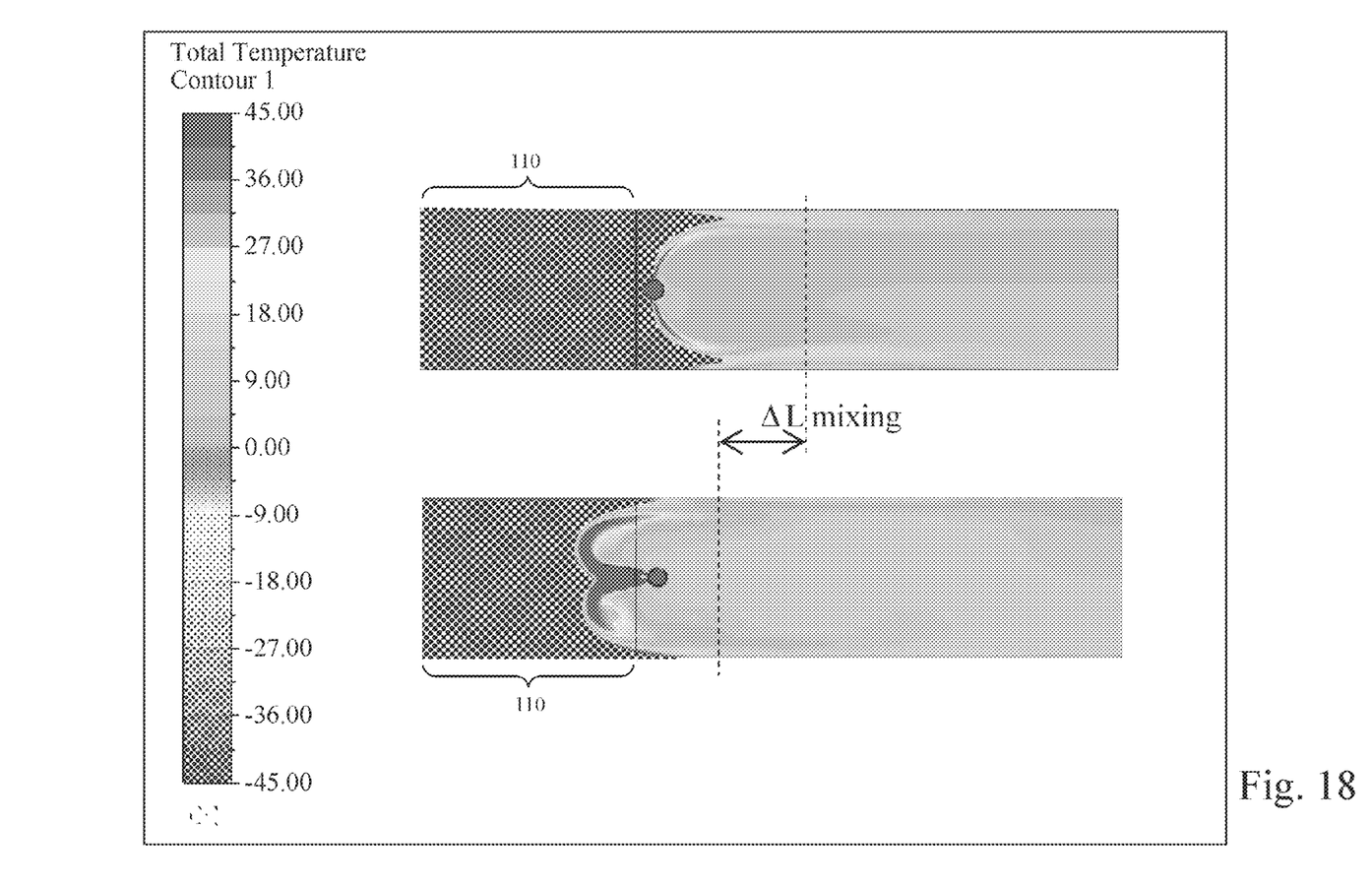
FIG. 18 illustrates results of a computational fluid dynamics model.

FIG. 18 shows the results of the computational fluid dynamics (CFD) model. The inlet flow temperature was set to −45° F. The inlet bleed flow was set to 6% of the total flow and 632.5° F. ΔL shows the difference in mixing length between the two configurations shown in FIGS. 16 and 17, with the top plot corresponding to FIG. 16 and the bottom plot corresponding to FIG. 17. An advantage that may be realized in the practice of some embodiments of the described systems and techniques is a much shorter mixing distance. Shorter mixing distance may be achieved by optimizing the orientation of the IBH jets 125. For example, the distance 500 in FIG. 1 is 24 feet whereas the distance 505 in FIG. 2 is 15 feet, which is a reduction in length of about 37.5% in one exemplary implementation.

As can bee seen in FIG. 18, with a configuration according to the present disclosure, mixing of the inlet bleed heat is initiated downstream of the silencer (at or near the orifices 120), continues within the silencer and upstream of the orifices, and may be considered complete somewhere downstream of the silencer, generally at the line indicated by ΔL in the lower image.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inlet system for a gas turbine, the inlet system comprising:
   an inlet air duct;
   a silencer disposed in the inlet air duct, the silencer including panels with spaces between the panels; and
   a conduit with orifices disposed to inject inlet bleed heat into each of the spaces, wherein
   each of the orifices is disposed along the conduit at a midpoint between two of the panels, and
   the midpoint includes deviations from ideal or nominal values that are within manufacturing and/or inspection tolerances.

2. The inlet system according to claim 1, wherein the orifices are located between an upstream end and a downstream end of the panels.

3. The inlet system according to claim 1, wherein the orifices are oriented to inject the inlet bleed heat with a first positive velocity component opposite to a direction of inlet air flow through the panels.

4. The inlet system according to claim 3, wherein the orifices are oriented to inject the inlet bleed heat with a second positive velocity component perpendicular to the direction of inlet air flow through the panels.

5. The inlet system according to claim 1, wherein the panels are parallel to one another and the conduit is perpendicular to the panels, and
   parallel and perpendicular include deviations from ideal or nominal values that are within manufacturing and/or inspection tolerances.

6. The inlet system according to claim 5, further comprising a second conduit with second orifices disposed to inject the inlet bleed heat into each of the spaces, wherein the second conduit is parallel to the conduit, and parallel includes deviations from ideal or nominal values that are within manufacturing and/or inspection tolerances.

7. The inlet system according to claim 1, wherein the orifices are sized to inject the inlet bleed heat at sonic velocity.

8. The inlet system according to claim 1, wherein a number of the orifices is an integer multiple of a number of the spaces.

9. The inlet system according to claim 1, wherein the orifices are disposed to inject the inlet bleed heat such that the inlet bleed heat changes flow direction within the spaces due to inlet air flow through the spaces.

10. A power plant comprising:
    a gas turbine, the gas turbine including a compressor, a combustion system, and a turbine section;
    a mechanical or electrical load; and
    an inlet system for the gas turbine, the inlet system comprising:
    an inlet air duct;
    a silencer disposed in the inlet air duct, the silencer including panels with spaces between the panels; and
    a conduit with orifices disposed to inject inlet bleed heat into each of the spaces, wherein
    each of the orifices is disposed along the conduit at a midpoint between two of the panels, and
    the midpoint includes deviations from ideal or nominal values that are within manufacturing and/or inspection tolerances.

11. A method of conditioning inlet air for a gas turbine, the method comprising:
    flowing air through spaces between panels of a silencer in an inlet air duct of the gas turbine, and
    injecting inlet bleed heat through orifices and into each of the spaces, the orifices being located so that each of the orifices align at a midpoint between two of the panels,
    wherein the midpoint includes deviations from ideal or nominal values that are within manufacturing and/or inspection tolerances.

12. The method according to claim 11, wherein the inlet bleed heat is injected between an upstream end and a downstream end of the panels.

13. The method according to claim 11, wherein the inlet bleed heat is injected with a first positive velocity component opposite to a direction of inlet air flow through the panels.

14. The method according to claim 13, the inlet bleed heat is injected with a second positive velocity component perpendicular to the direction of inlet air flow through the panels.

15. The method according to claim 11, wherein the inlet bleed heat is injected upstream of the panels.

16. The method according to claim 11, further comprising causing a direction that the inlet bleed heat flows to change due to inlet air flow through the spaces.

17. The method according to claim 11, further comprising reversing the inlet bleed heat flow direction within the spaces after exiting the orifices.

18. The method according to claim 11, further comprising initiated mixing of the inlet bleed heat downstream of the silencer, and continuing mixing within the silencer and upstream of the orifices.

19. The method according to claim 18, further comprising completing mixing downstream of the silencer.

20. An inlet system for a gas turbine, the system inlet comprising:
   an inlet air duct;
   a silencer disposed in the inlet air duct, the silencer including panels with spaces between the panels; and
   a conduit with orifices disposed to inject inlet bleed heat into each of the spaces, wherein
   the orifices are oriented to inject the inlet bleed heat with a first positive velocity component opposite to a direction of inlet air flow through the panels and a second positive velocity component perpendicular to the direction of inlet air flow through the panels.

21. A method of conditioning inlet air for a gas turbine, the method comprising:
   flowing air through spaces between panels of a silencer in an inlet air duct of the gas turbine,
   injecting inlet bleed heat through orifices and into each of the spaces, the orifices being located to align with the spaces; and
   reversing an inlet bleed heat flow direction within the spaces after exiting the orifices.

* * * * *

UNITED STATES PATENT AND TRADEMARK OFFICE
CERTIFICATE OF CORRECTION

PATENT NO. : 9,359,951 B2  
APPLICATION NO. : 14/019791  
DATED : June 7, 2016  
INVENTOR(S) : Merchant et al.

It is certified that error appears in the above-identified patent and that said Letters Patent is hereby corrected as shown below:

In the Specification:

Column 7, line 41, change "As can bee seen" to --As can be seen--

In the Claims:

Claim 20, column 9, line 14, change "the system inlet" to --the inlet system--

Signed and Sealed this  
Ninth Day of August, 2016

Michelle K. Lee  
*Director of the United States Patent and Trademark Office*